(12) United States Patent  
Oeda et al.

(10) Patent No.: US 9,857,201 B2  
(45) Date of Patent: Jan. 2, 2018

(54) ONBOARD DETECTOR

(71) Applicant: Hitachi Metals, Ltd., Tokyo (JP)

(72) Inventors: Shinya Oeda, Hitachi (JP); Yukio Ikeda, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 106 days.

(21) Appl. No.: 14/559,959

(22) Filed: Dec. 4, 2014

(65) Prior Publication Data

US 2016/0161286 A1 Jun. 9, 2016

(51) Int. Cl.
*G01D 5/14* (2006.01)
*G01D 11/24* (2006.01)

(52) U.S. Cl.
CPC ............ *G01D 5/145* (2013.01); *G01D 11/245* (2013.01)

(58) Field of Classification Search
CPC ...................................................... G01L 5/221
See application file for complete search history.

(56) References Cited

U.S. PATENT DOCUMENTS

| 6,868,744 | B2 | 3/2005 | Sugimura et al. |
| 6,988,422 | B2 | 1/2006 | Sugimura et al. |
| 7,421,909 | B2 | 9/2008 | Tsuge |
| 2003/0167857 | A1 | 9/2003 | Sugimura et al. |
| 2005/0126310 | A1 | 6/2005 | Sugimura et al. |
| 2005/0247139 | A1 | 11/2005 | Sugimura et al. |
| 2006/0260418 | A1* | 11/2006 | Tsuge ..................... G01P 1/026 73/862.331 |
| 2011/0127995 | A1* | 6/2011 | Nishikawa ............ G01D 5/245 324/207.14 |

(Continued)

FOREIGN PATENT DOCUMENTS

| JP | S50122688 A | 9/1975 |
| JP | S58049565 U | 4/1983 |
| JP | 2003-329523 A | 11/2003 |

(Continued)

OTHER PUBLICATIONS

Japanese Office Action for corresponding Japanese Patent Application No. 2013-121474 dated Aug. 23, 2016 and English translation thereof.

(Continued)

*Primary Examiner* — Arleen M Vazquez
*Assistant Examiner* — Feba Pothen
(74) *Attorney, Agent, or Firm* — Roberts Mlotkowski Safran Cole & Calderon P.C.

(57) ABSTRACT

An onboard detector includes a cable including an insulated wire including a center conductor and an insulation covering the center conductor and a sheath covering the insulated wire, a sensor including a sensor main body including a detecting element and a lead wire extending from the sensor main body and connected to the center conductor, and a fixing member to fix the sensor to the cable. The fixing member is configured to fix the insulated wire exposed from the sheath while being bent between the sheath and the lead wire. The insulated wire fixed while being bent allows the cable to be arranged such that an axial direction of the sheath inside the fixing member intersects with a direction parallel to a longitudinal direction of the lead wire.

17 Claims, 12 Drawing Sheets

(56) References Cited

U.S. PATENT DOCUMENTS

2013/0131927 A1* 5/2013 Ishihara .................. B62D 6/00
                                                    701/43
2015/0158220 A1* 6/2015 Ikeda .................. G01D 11/245
                                                    324/71.1

FOREIGN PATENT DOCUMENTS

JP          2006-275872 A      10/2006
JP          2006-322875 A      11/2006

OTHER PUBLICATIONS

Japanese Patent Application Counterpart Japanese Patent Office Issued an Office Action dated April 19, 2016.

* cited by examiner

- 1 TORQUE DETECTOR
- 10 TORSION BAR
- 11 INPUT SHAFT
- 12 COUPLING MEMBER
- 15
- 13
- 14
- 3 SENSOR MODULE
- 16 AUXILIARY YOKE
- 22 ADAPTOR
- 23 24
- 40 CABLE
- 21 OUTPUT SHAFT

- 31 HOUSING CASE ⎫ 30
- 32 MOLDED ARTICLE ⎭
- 141
- 142
- 41
- 31a
- 241
- 242 31b
- 300 FIXING METAL FITTING

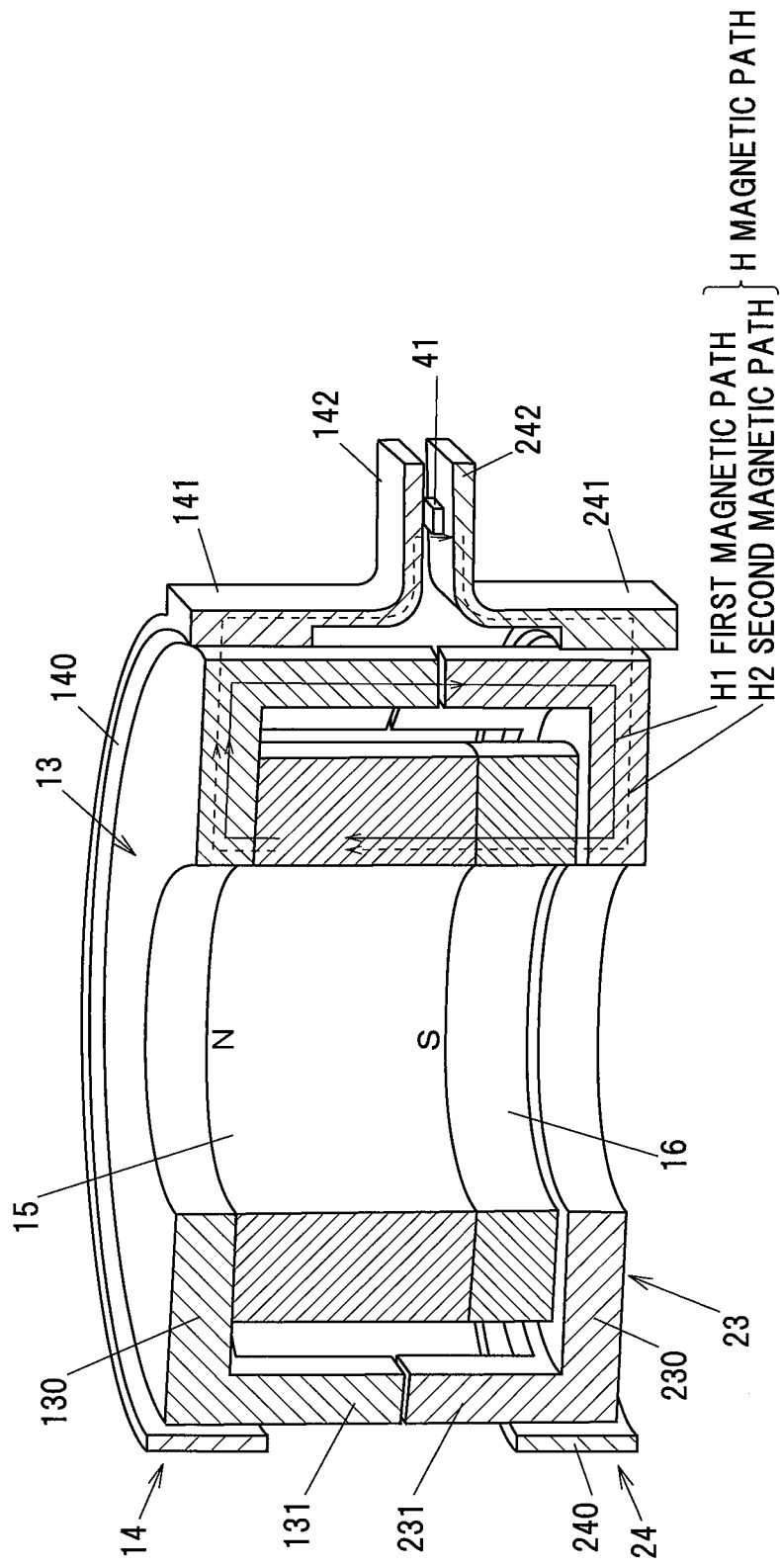

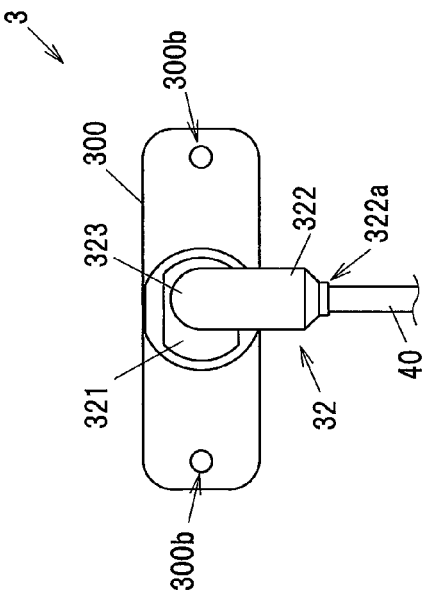
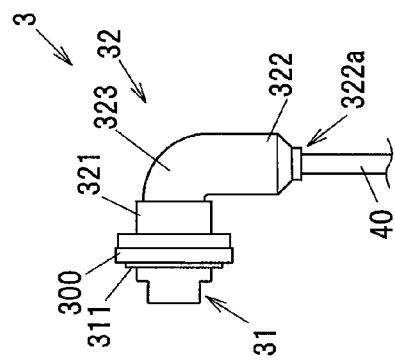
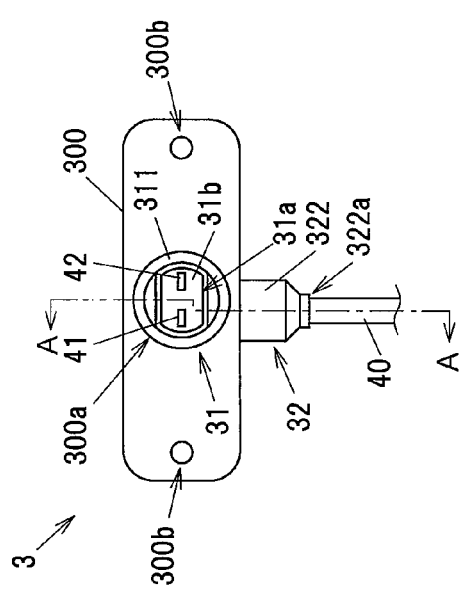
FIG.5C
FIG.5A
FIG.5B

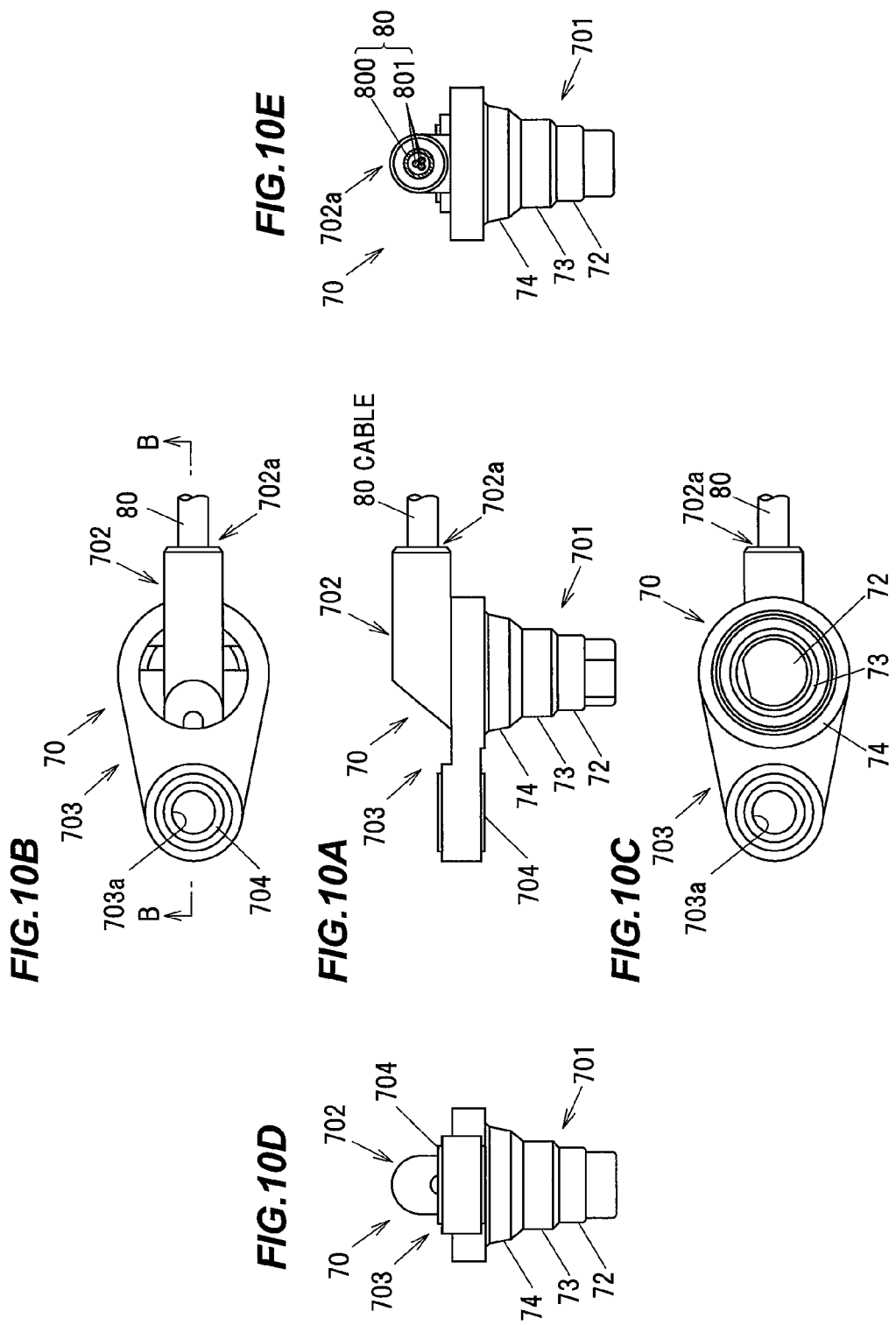

ONBOARD DETECTOR

The present application is based on Japanese patent application No. 2013-121474 filed on Jun. 10, 2013, the entire contents of which are incorporated herein by reference.

BACKGROUND OF THE INVENTION

1. Field of the Invention

The invention relates to an onboard detector which is mounted on a vehicle so as to detect physical quantities of the vehicle.

2. Description of the Related Art

Vehicle detectors are known that include a torque detector for detecting torque applied to a vehicle steering and a rotation detector for detecting a rotational state of a wheel (see e.g. JP-A-2003-329523 at paragraph 0009 and FIG. 5, and JP-A-2006-322875 at paragraphs 0006 and 0042).

A torque detector disclosed in JP-A-2003-329523 is provided with an input shaft linked to a steering, an output shaft linked to a steered wheel, a torsion bar coupling the input shaft to the output shaft, a multipole magnet, a pair of multipolar yokes and a magnetic sensor, and is configured that the multipole magnet and the pair of multipolar yokes are relatively rotated by twist of the torsion bar caused by torque applied to the steering. A pair of magnetism collecting rings having an annular shape is arranged on the outer peripheral side of the pair of multipolar yokes and a magnetism collecting portion is provided on each magnetism collecting ring at a circumferential position so as to radially protrude. The magnetic sensor is sandwiched between the magnetism collecting portion of one of the magnetism collecting rings and the magnetism collecting portion of the other magnetism collecting ring.

In the torque detector, when the multipole magnet and the pair of multipolar yokes are relatively rotated, magnetic field strength to be detected by the magnetic sensor varies according to the relative rotation angle. This variation in magnetic field strength allows torque applied to the steering to be detected. The magnetic sensor, together with the pair of magnetism collecting rings and a lead wire (cable), is molded with resin and outputs signals of the magnet sensor are output to the outside through the lead wire.

A vehicle rotation detector disclosed in JP-A-2006-322875 is provided with a Hall IC for detecting magnetic field strength, a wire (cable) of which core is connected to an IC lead extending from the Hall IC, and a resin member formed to cover such portions and to fix the Hall IC and the wire to each other. The Hall IC is arranged in the vicinity of an axle to detect magnetic field strength which varies with rotation of a wheel.

In the vehicle rotation detector, in light of the problem that the wire when arranged to extend out of the resin member along the axial direction of the Hall IC comes into contact with a vehicle body or other components mounted on a vehicle (vehicle members such as suspension arm or brake dust cover), the wire extends out of the resin member so as to be perpendicular to the axis of the Hall IC. In other words, the wire is curved with an arc angle of 90° inside the resin member.

SUMMARY OF THE INVENTION

Recently, due to the need for reduction in size and weight of the vehicle, various on-vehicle devices are needed to more densely mount thereon. The detectors are also needed to be more improved in the on-vehicle mountability. For example, although it is possible to prevent contact of the wire with vehicle members by bending the wire inside the resin member as is disclosed in JP-A-2006-322875, the bending of the wire inside the resin member may increase the size of the resin member depending on the radius of the bending.

It is an object of the invention to provide an onboard detector that allows the downsizing of a fixing member for fixing a sensor to a cable and the improvement in the on-vehicle mountability.

(1) According to one embodiment of the invention, an onboard detector comprises:

a cable comprising an insulated wire comprising a center conductor and an insulation covering the center conductor and a sheath covering the insulated wire;

a sensor comprising a sensor main body comprising a detecting element and a lead wire extending from the sensor main body and connected to the center conductor; and a fixing member to fix the sensor to the cable, wherein the fixing member is configured to fix the insulated wire exposed from the sheath while being bent between the sheath and the lead wire, and wherein the insulated wire fixed while being bent allows the cable to be arranged such that an axial direction of the sheath inside the fixing member intersects with a direction parallel to a longitudinal direction of the lead wire.

Advantageous Effects of the Invention

According to one embodiment of the invention, an onboard detector can be provided that allows the downsizing of a fixing member for fixing a sensor to a cable and the improvement in the on-vehicle mountability.

BRIEF DESCRIPTION OF THE DRAWINGS

Next, the present invention will be explained in more detail in conjunction with appended drawings, wherein:

FIGS. 1A and 1B show a torque detector in a first embodiment of the present invention, wherein FIG. 1A is a cross sectional view of the whole device and FIG. 1B is a partially enlarged view of FIG. 1A;

FIG. 3 is a cross-sectional perspective view showing the torque detector to explain a magnetic path therein;

FIGS. 4A and 4B are explanatory diagrams illustrating movement of the torque detector, wherein FIG. 4A shows a state in which a torsion bar is not twisted and FIG. 4B shows a state in which the torsion bar is twisted;

FIGS. 5A to 5C show a sensor module, wherein FIG. 5A is a front view, FIG. 5B is a left side view and FIG. 5C is a right side view;

FIGS. 7A and 7B show a lead frame and magnetic field sensors held in a housing case, wherein FIG. 7A is a plan view and FIG. 7B is a side view;

FIGS. 10A to 10E show the sensor module, wherein FIG. 10A is a front view, FIG. 10B is a top view, FIG. 10C is a bottom view, FIG. 10D is a left side view and FIG. 10E is a right side view;

DETAILED DESCRIPTION OF THE PREFERRED EMBODIMENTS

First Embodiment

Figure 1A:
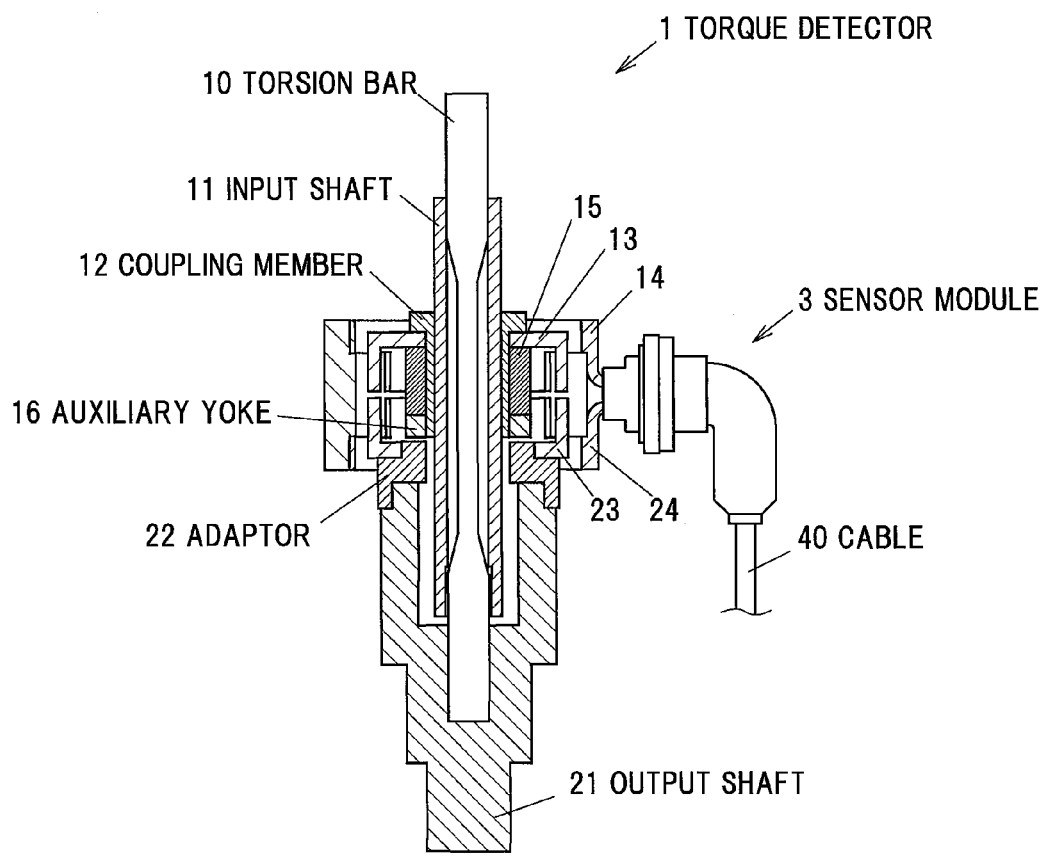
Figure 1B:
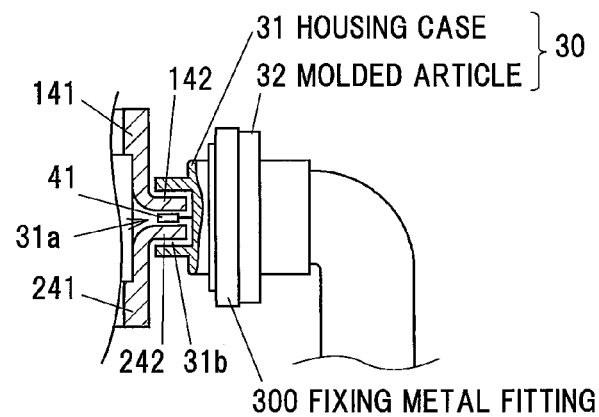
Figure 2:
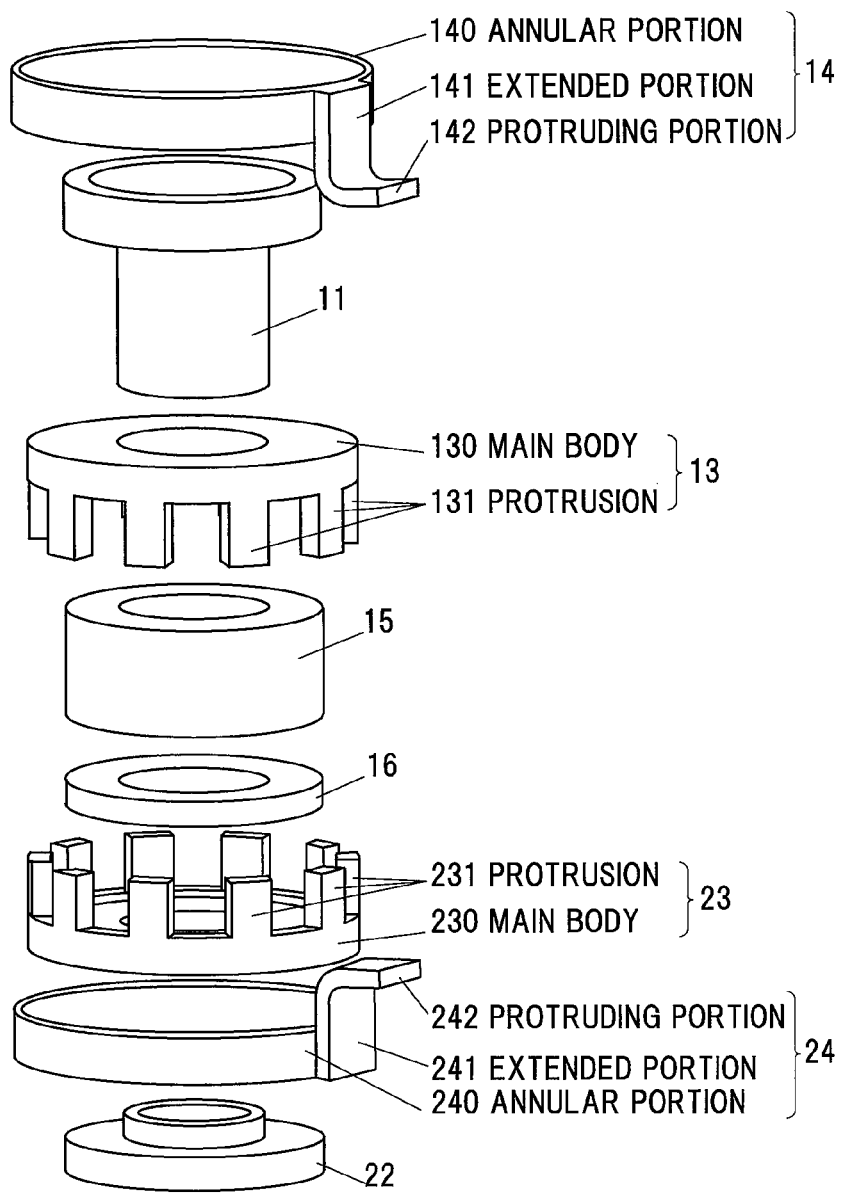
FIG. 2 is an exploded perspective view showing the torque detector.

FIGS. 1A and 1B show a torque detector 1 in the first embodiment of the invention, wherein FIG. 1A is a cross sectional view of the whole device and FIG. 1B is a partially enlarged view of FIG. 1A. FIG. 2 is an exploded perspective view showing the torque detector 1.

Configuration of Torque Detector 1

The torque detector 1 is mounted on a vehicle to detect steering torque applied to a steering wheel by a driver. An electrically-assisted power steering system for assisting a steering operation is provided on a steering system of a vehicle and torque for turning steered wheels (front wheels) is output from an electric motor of the electrically-assisted power steering system according to steering torque detected by the torque detector 1.

The torque detector 1 has a torsion bar 10 interposed between an input shaft 11 coupled on a steering wheel side and an output shaft 21 coupled on a steered wheel side, first and second rotating yokes 13 and 23, first and second fixed yokes 14 and 24, a cylindrical magnet 15, an auxiliary yoke 16, and a sensor module 3.

The torsion bar 10 is an elastic member having higher elasticity than the input shaft 11 and the output shaft 21 and transmits steering torque from the input shaft 11 to the output shaft 21 by being twisted according to the torque applied to the steering wheel.

On the outer peripheral surface of the input shaft 11, the first rotating yoke 13 having an annular shape is relatively non-rotatably coupled to the input shaft 11 via a cylindrical coupling member 12. The first fixed yoke 14 having an annular shape is arranged on the outer side of the first rotating yoke 13 with a gap therebetween. In addition, the magnet 15 and the auxiliary yoke 16 are fixed to the outer peripheral surface of the coupling member 12 so as to be aligned with the first rotating yoke 13 in an axial direction. The magnet 15 is a permanent magnet which is magnetized with an N-pole on one side in an axial direction and with an S-pole on the other side in the axial direction.

The second rotating yoke 23 having an annular shape is relatively non-rotatably coupled to the output shaft 21 via an adaptor 22. The second fixed yoke 24 having an annular shape is arranged on the outer side of the second rotating yoke 23 with a gap therebetween.

As shown in FIG. 2, the first rotating yoke 13 has integrally an annular main body 130 and plural (ten in the first embodiment) protrusions 131 protruding from the main body 130 in the axial direction. Likewise, the second rotating yoke 23 has integrally an annular main body 230 and plural protrusions 231 (the same number as the protrusions 131 of the first rotating yoke 13) protruding from the main body 230 in the axial direction.

The first fixed yoke 14 has integrally an annular portion 140 of which inner surface faces the main body 130 of the first rotating yoke 13 in the radial direction, an extended portion 141 extending from the annular portion 140 in the axial direction and a protruding portion 142 protruding outward from an end portion of the extended portion 141 (protruding in a direction of separating from the torsion bar 10). Likewise, the second fixed yoke 24 has integrally an annular portion 240 of which inner surface faces the main body 230 of the second rotating yoke 23 in the radial direction, an extended portion 241 extending from the annular portion 240 in the axial direction and a protruding portion 242 protruding outward from an end portion of the extended portion 241.

FIG. 1B is a partial cutaway view showing the inside of the sensor module 3 of FIG. 1A. The sensor module 3 has first and second magnetic field sensors 41 and 42 (only the first magnetic field sensor 41 is shown in FIG. 1B), a cable 40, a resin case 30 as a fixing member for fixing the first and second magnetic field sensors 41 and 42 to the cable 40, and a plate-shaped fixing metal fitting 300 for fixing the resin case 30 to a vehicle body. The resin case 30 has a resin housing case 31 for housing the first and second magnetic field sensors 41 and 42 and a molded article 32 formed of a mold resin molded to enclose at least a portion of the housing case 31.

The first and second magnetic field sensors 41 and 42 are arranged between the protruding portion 142 of the first fixed yoke 14 and the protruding portion 242 of the second fixed yoke 24 which are inserted into a housing space 31b through an opening 31a of the housing case 31. The detailed configuration of the sensor module 3 will be described later.

Figure 4A:
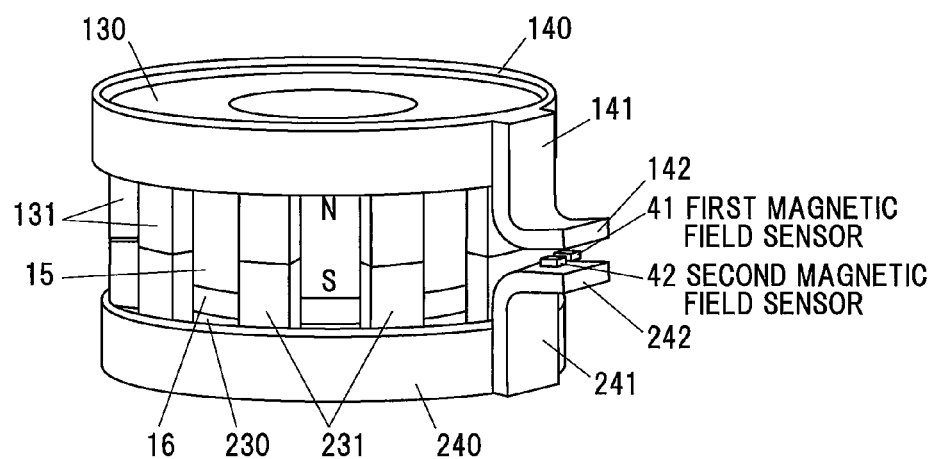
Figure 4B:
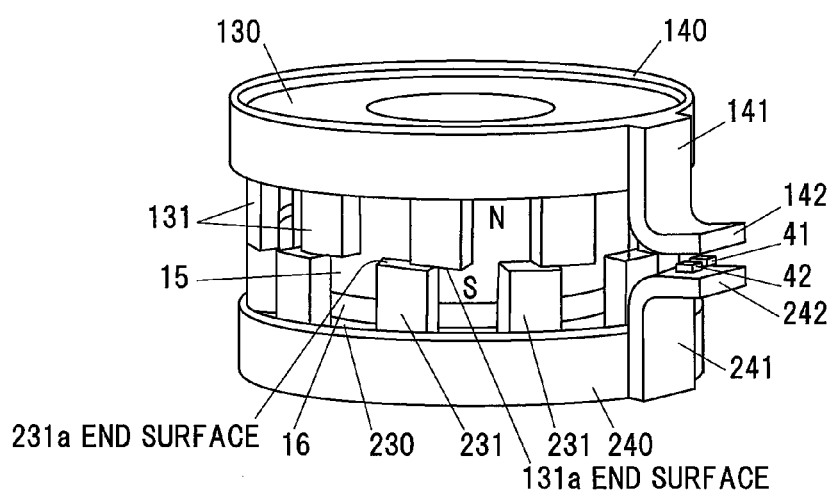

FIG. 3 is a cross-sectional perspective view showing the torque detector 1 to explain a magnetic path therein. FIGS. 4A and 4B are explanatory diagrams illustrating movement of the torque detector 1, wherein FIG. 4A shows a state in which the torsion bar 10 is not twisted and FIG. 4B shows a state in which the torsion bar 10 is twisted. The illustration of the resin case 30 of the sensor module 3 is omitted in FIGS. 3 to 4B.

As shown in FIG. 3, a magnetic circuit in the torque detector 1 is formed of a magnetic path H composed a first magnetic path H1 and a second magnetic path H2. The first magnetic path H1 is formed by the magnet 15, the first and second rotating yokes 13, 23 and the auxiliary yoke 16. The second magnetic path H2 is formed by the magnet 15, the main bodies 130, 230 of the first and second rotating yokes 13, 23, the first and second fixed yokes 14, 24 and the auxiliary yoke 16.

When torque acts on the input shaft 11 and the torsion bar 10 is twisted, the first rotating yoke 13 is relatively displaced with respect to the second rotating yoke 23 according to the twist and this causes a decrease in an area of an end surface 131a of the protrusion 131 of the first rotating yoke 13 facing an end surface 231a of the protrusion 231 of the second rotating yoke 23, as shown in FIG. 4B. This causes an increase in magnetic reluctance in the first magnetic path H1 and a resulting decrease in density of magnetic flux flowing through the first magnetic path H1. Magnetic reluctance in the second magnetic path H2 is constant regardless of presence of torque acting on the input shaft 11. Therefore, magnetic flux density of the second magnetic path H2 becomes larger with the decrease in the magnetic flux density of the first magnetic path H1.

This allows the first and second magnetic field sensors 41 and 42 to detect the amount of twist of the torsion bar 10, i.e., a steering force (steering torque) transmitted from the input shaft 11 to the output shaft 21, as a change in the magnetic flux density of the second magnetic path H2.

Configuration of Sensor Module 3

Figure 6:
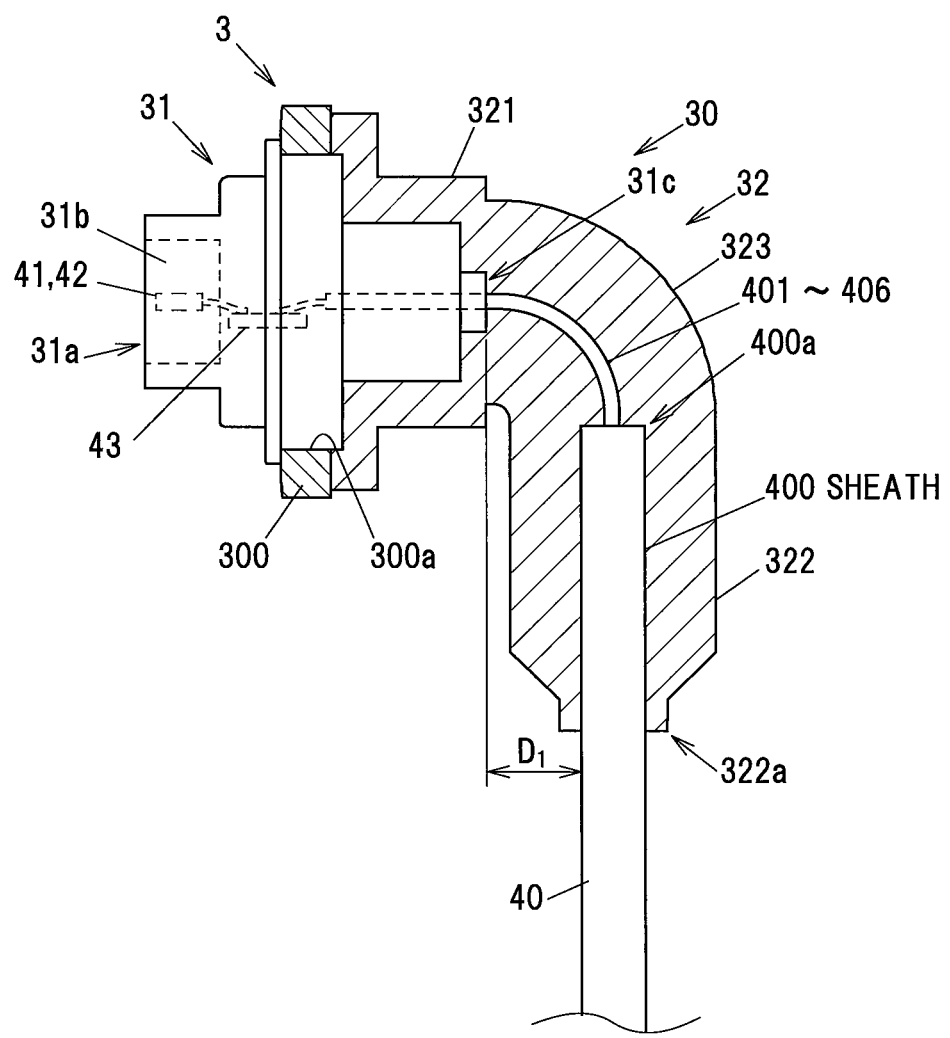
FIG. 6 is a cross sectional view showing the sensor module when a molded article is cut along a line A-A in FIG. 5B.
Figure 7A:
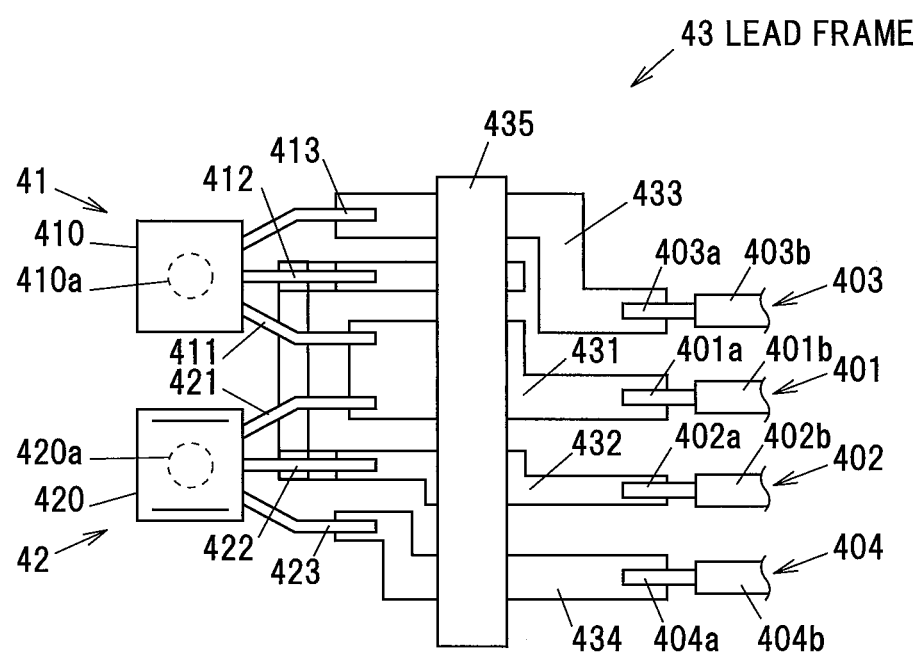
Figure 7B:
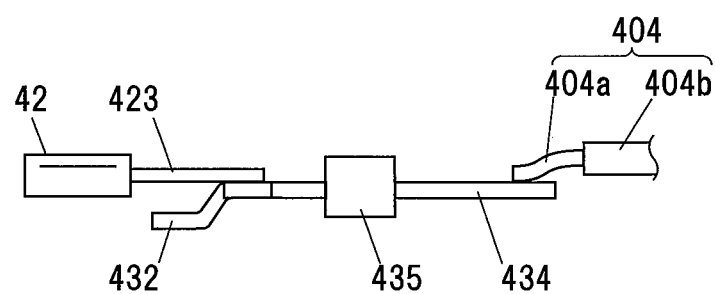

Next, the configuration of the sensor module 3 will be described in reference to FIGS. 5A to 7B. FIGS. 5A to 5C show an appearance of the sensor module 3, wherein FIG. 5A is a front view, FIG. 5B is a left side view and FIG. 5C is a right side view. FIG. 6 is a cross sectional view showing the sensor module 3 when the molded article 32 is cut along a line A-A in FIG. 5B. FIGS. 7A and 7B show a lead frame 43 and the first and second magnetic field sensors 41 and 42 held in the housing case 31, wherein FIG. 7A is a plan view and FIG. 7B is a side view.

As shown in FIG. 5B, the housing case 31 has the opening 31a allowing the first and second magnetic field sensors 41 and 42 to be seen from the outside, and the first and second magnetic field sensors 41 and 42 are arranged in the housing space 31b of the housing case 31 so as to be side-by-side in a circumferential direction of the torsion bar 10 (shown in FIG. 1). In the first embodiment, the first and second magnetic field sensors 41 and 42 are Hall ICs and are arranged so that a detection direction to detect a magnetic field is opposite to each other. This arrangement offset influences of temperature characteristics and detection sensitivity in the axial direction of the Hall ICs and increases detection accuracy of the torque detector 1.

As shown in FIG. 5A, the molded article 32 is arranged to sandwich the fixing metal fitting 300 between itself and a flange ring 311 of the housing case 31 and is integrated with the housing case 31 and the fixing metal fitting 300. The molded article 32 has a fixing portion 321 for fixing the fixing metal fitting 300 between itself and the flange ring 311 of the housing case 31, a cylindrical portion 322 having the central axis coincide with an extending-out direction of the cable 40 and extending in a direction parallel to the torsion bar 10, and a curve portion 323 formed in an arc tube shape between the fixing portion 321 and the cylindrical portion 322 so as to be continuous from the cylindrical portion 322 and to be curved in an arch shape. The fixing portion 321 covers a portion of the housing case 31 (see FIG. 6).

The fixing metal fitting 300 has a rectangular shape on which a through-hole 300a for inserting a portion of the housing case 31 is formed in the middle. Bolt insertion holes 300b, through which bolts are inserted to fix the fixing metal fitting 300 to a vehicle body, are formed at both longitudinal ends of the fixing metal fitting 300.

The cable 40 extends out from an end portion 322a of the cylindrical portion 322 of the molded article 32 in a direction parallel to the torsion bar 10. The cable 40 has a sheath 400 and first to sixth insulated wires 401 to 406, as shown in FIG. 6. The first to sixth insulated wires 401 to 406 are covered, all together, with the sheath 400 inside the cylindrical portion 322 of the molded article 32 and outside the molded article 32.

As shown in FIGS. 7A and 7B, the first to sixth insulated wires 401 to 406 are configured that center conductors 401a, 402a, 403a, 404a, 405a and 406a are respectively covered with insulations 401b, 402b, 403b, 404b, 405b and 406b. The center conductors 401a, 402a, 403a, 404a, 405a and 406a of the first to sixth insulated wires 401 to 406 are connected to the lead frame 43.

The lead frame 43 has first to sixth wiring leads 431 to 436 respectively connected to the center conductors 401a, 402a, 403a, 404a, 405a and 406a of the first to sixth insulated wires 401 to 406 and a bar-shaped insulating-resin fixing member 430 for fixing the first to sixth wiring leads 431 to 436 to each other.

The first magnetic field sensor 41 has a sensor main body 410 including a detecting element 410a and first to third lead wires 411 to 413 extending from the sensor main body 410. The first lead wire 411 is a power line and the second lead wires 412 is a GND line. The third lead wire 413 is a signal output line of the first magnetic field sensor 41. The second magnetic field sensor 42 has a sensor main body 420 including a detecting element 420a and first to third lead wires 421 to 423 extending from the sensor main body 420. The first lead wire 421 is a power line and the second lead wires 422 is a GND line. The third lead wire 423 is a signal output line of the second magnetic field sensor 42.

The first to third wiring leads 431 to 433 are conductive members formed of plate-shaped metal extending in a direction parallel to a longitudinal direction of the first to third lead wires 411 to 413 of the first magnetic field sensor 41. The fourth to sixth wiring leads 434 to 436 are conductive members formed of plate-shaped metal extending in a direction parallel to a longitudinal direction of the first to third lead wires 421 to 423 of the second magnetic field sensor 42. The first to sixth wiring leads 431 to 436 are fixed by the fixing member 430 so as to be parallel to each other.

To the first wiring lead 431, the first lead wire 411 of the first magnetic field sensor 41 is connected to one longitudinal end and the center conductor 401a of the first insulated wire 401 is connected to the other longitudinal end. To the second wiring lead 432, the second lead wire 412 of the first magnetic field sensor 41 is connected to one longitudinal end and the center conductor 402a of the second insulated wire 402 is connected to the other longitudinal end. In addition, to the third wiring lead 433, the third lead wire 413 of the first magnetic field sensor 41 is connected to one longitudinal end and the center conductor 403a of the third insulated wire 403 is connected to the other longitudinal end.

To the fourth wiring lead 434, the first lead wire 421 of the second magnetic field sensor 42 is connected to one longitudinal end and the center conductor 404a of the fourth insulated wire 404 is connected to the other longitudinal end. To the fifth wiring lead 435, the second lead wire 422 of the second magnetic field sensor 42 is connected to one longitudinal end and the center conductor 405a of the fifth insulated wire 405 is connected to the other longitudinal end. In addition, to the sixth wiring lead 436, the third lead wire 423 of the second magnetic field sensor 42 is connected to one longitudinal end and the center conductor 406a of the sixth insulated wire 406 is connected to the other longitudinal end.

In the first embodiment, the detecting element 410a of the first magnetic field sensor 41 and the detecting element 420a of the second magnetic field sensor 42 are Hall elements which detect a magnetic field using the Hall effect. The detecting element 410a of the first magnetic field sensor 41 is connected to the first to third lead wires 411 to 413 inside the sensor main body 410. The detecting element 420a of the second magnetic field sensor 42 is connected to the first to third lead wires 421 to 423 inside the sensor main body 420. The detecting elements 410a and 420a detect magnetic field strength which varies according to a steering force of a steering wheel (a steering).

As shown in FIG. 6, the resin case 30 is configured that the first to sixth insulated wires 401 to 406 exposed from an end portion 400a of the sheath 400 inside the molded article 32 are fixed in a state of being bent between the sheath 400 and the first to third lead wires 411 to 413 and 421 to 423 of the first and second magnetic field sensors 41 and 42. In addition, the resin case 30 fixes the sheath 400 in a linear manner inside the cylindrical portion 322. The first to sixth insulated wires 401 to 406 are fixed in a bent state and the cable 40 is thereby arranged such that an axial direction of the sheath 400 inside the resin case 30 (inside the cylindrical portion 322 of the molded article 32) intersects with a direction parallel to a longitudinal direction of the first to third lead wires 411 to 413 and 421 to 423 of the first and second magnetic field sensors 41 and 42 (a horizontal direction in FIG. 6).

By the housing case 31, end portions of the first to sixth insulated wires 401 to 406 connected to the lead frame 43 are fixed along a longitudinal direction of the first to third lead wires 411 to 413 and 421 to 423 of the first and second magnetic field sensors 41 and 42. The first to sixth insulated wires 401 to 406 extend out to the outside of the housing case 31 through a lead-out portion 31c thereof. The molded article 32 is configured that the first to sixth insulated wires 401 to 406 exposed from the sheath 400 are fixed in a state of being bent between the sheath 400 and the lead-out portion 31c of the housing case 31.

The molded article 32 is configured so that the cylindrical portion 322 covers a portion of the sheath 400 including the end portion 400a through which the first to sixth insulated wires 401 to 406 extend out and that the fixing portion 321 covers a portion of the housing case 31. The molded article 32 may alternatively cover the entire housing case 31. In other words, the molded article 32 is formed by molding to cover at least a portion of the housing case 31 (a portion including the lead-out portion 31c).

In the first embodiment, the longitudinal direction of the first to third lead wires 411 to 413 and 421 to 423 of the first and second magnetic field sensors 41 and 42 is orthogonal to the axial direction of the sheath 400 inside the resin case 30 (the axial direction of the cylindrical portion 322). In more detail, the first to sixth insulated wires 401 to 406 are curved in an arc shape at an angle of substantially 90° inside the curve portion 323 of the molded article 32.

An outer diameter of the sheath 400 is, e.g., 5 mm and that of each of the first to sixth insulated wires 401 to 406 is, e.g., 1.5 mm. The radius of curvature at the bent portion of the first to sixth insulated wires 401 to 406 inside the curve portion 323 of the molded article 32 is, e.g., not less than 3.5 mm and not more than 10 mm. In addition, a distance $D_1$ in the longitudinal direction of the first to third lead wires 411 to 413 and 421 to 423 of the first and second magnetic field sensors 41 and 42 between the lead-out portion 31c of the housing case 31 and the outer peripheral surface of the sheath 400 of the cable 40 at the end portion 322a of the cylindrical portion 322 of the molded article 32 is, e.g., not less than 3.5 mm and not more than 10 mm.

Comparative Example

Figure 8:
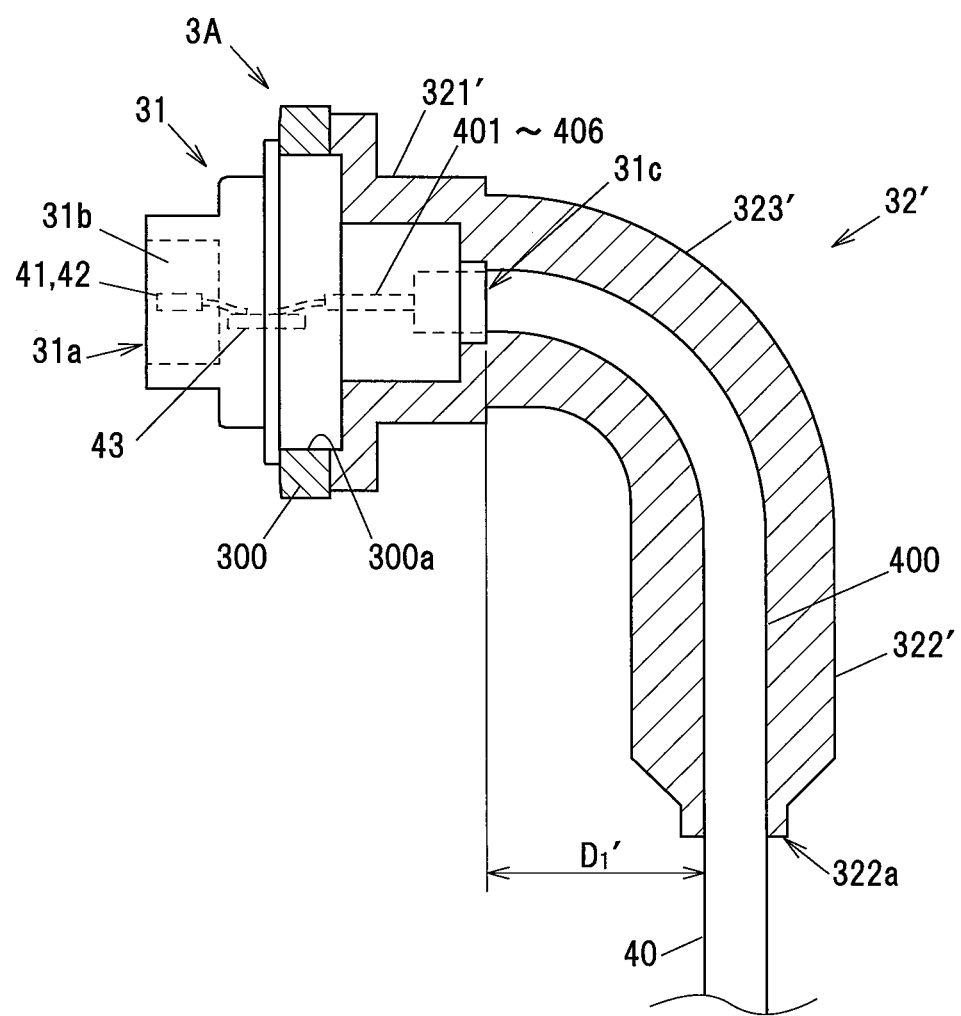
FIG. 8 is a cross sectional view showing a sensor module in Comparative Example with respect to the first embodiment.

FIG. 8 is a cross sectional view showing a sensor module 3A in Comparative Example. The sensor module 3A is configured in the same manner as the sensor module 3, except that a molded article 32' has a different shape from the molded article 32 of the sensor module 3 in the first embodiment and the end portion of the sheath 400 of the cable 40 is housed in the housing case 31. In FIG. 8, substantially the same constituent elements as those of the sensor module 3 in the first embodiment are denoted by the same reference numerals as those in FIG. 6 and the explanation thereof will be omitted.

The molded article 32' of the sensor module 3A has a fixing portion 321' corresponding to the fixing portion 321 of the sensor module 3, a cylindrical portion 322' corresponding to the cylindrical portion 322 of the sensor module 3 and a curve portion 323' corresponding to the curve portion 323 of the sensor module 3 but the radius of curvature of the central axis of the curve portion 323' is larger than that of the curve portion 323.

This difference in the radius of curvature is caused by that a portion of the cable 40 bent in the curve portion 323' is covered with the sheath 400. In other words, since the sheath 400 is less flexible than the first to sixth insulated wires 401 to 406 due to the larger outer diameter and higher hardness, the curve portion 323' of the sensor module 3A cannot be formed to have the radius of curvature equivalent to the curve portion 323 in the first embodiment and the size of the molded article 32' is thus larger than the molded article 32 in the first embodiment.

In the sensor module 3A, a distance $D_1'$ in the longitudinal direction of the first to third lead wires 411 to 413 and 421 to 423 of the first and second magnetic field sensors 41 and 42 between the lead-out portion 31c of the housing case 31 and the outer peripheral surface of the sheath 400 at an end portion 322a' of the cylindrical portion 322' of the molded article 32' is twice or more of the distance $D_1$ in the sensor module 3 of the first embodiment. In addition, the radius of curvature of the bend portion of the sheath 400 at the curve portion 323' is also twice or more of the radius of curvature of the first to sixth insulated wires 401 to 406 at the curve portion 323 of the sensor module 3 in the first embodiment.

Functions and Effects of the First Embodiment

The following functions and effects are obtained in the first embodiment.

(1) The sheath 400 is fixed in a linear manner inside the cylindrical portion 322 of the molded article 32 and the first to sixth insulated wires 401 to 406 exposed from the end portion 400a of the sheath 400 are bent inside the molded article 32 (in the curve portion 323), and the cable 40 thereby extends out from the end portion 322a of the molded article 32 in a direction parallel to the torsion bar 10. This prevents the cable 40 extending out of the molded article 32 from coming into contact with other members mounted on a vehicle and allows the molded article 32 to be downsized (a decrease in the size in a direction orthogonal to the rotational axis of the torsion bar 10), and mountability of the torque detector 1 on the vehicle is improved.

(2) Since the first to sixth insulated wires 401 to 406 are fixed along the longitudinal direction of the first to third lead wires 411 to 413 and 421 to 423 of the first and second magnetic field sensors 41 and 42 inside the housing case 31 and are fixed in a bent state inside the molded article 32, a load applied to the connecting portions of the center conductors 401a, 402a, 403a, 404a, 405a and 406a of the first to sixth insulated wires 401 to 406 due to flow of molten resin at the time of manufacture can be reduced as compared to the case where, e.g., the entire resin case 30 is formed by molding. In addition, the housing case 31 allows the first to sixth insulated wires 401 to 406 to be positioned inside the resin case 30 and it is thus possible to prevent, e.g., the first to sixth insulated wires 401 to 406 from being exposed to the outer surface of the molded article 32. In other words, when, e.g., the entire resin case 30 is formed by molding, there is a possibility that the first to sixth insulated wires 401 to 406 are moved by the flow of the molten resin at the time of manufacture and are exposed to the outer surface of the molded article 32. Unlike this case, it is possible to avoid such a problem in the first embodiment.

Second Embodiment

Next, the second embodiment of the invention will be described in reference to FIGS. 9A to 11.

Figure 9A:
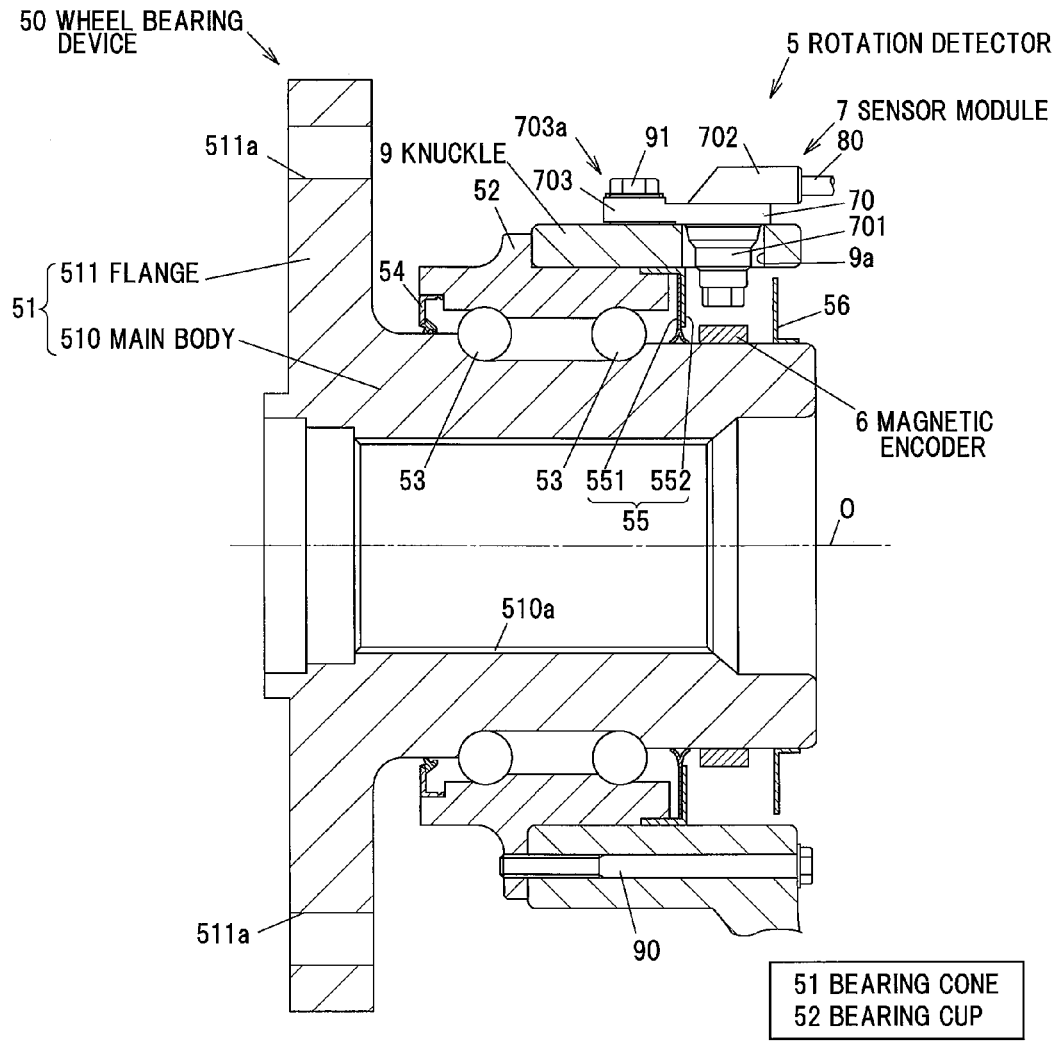
FIG. 9A is a cross sectional view showing a configuration example of a wheel bearing device and the periphery thereof in a second embodiment of the invention.
Figure 9B:
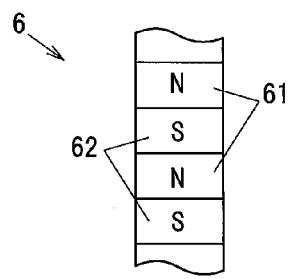
FIG. 9B is a plan view showing a configuration example of a magnetic encoder of a rotation detector.

FIG. 9A is a cross sectional view showing a configuration example of a rotation detector 5 in the second embodiment of the invention and a vehicle wheel bearing device 50 having the rotation detector 5. FIG. 9B is a plan view showing a configuration example of a magnetic encoder 6 of the rotation detector 5.

Configuration of Wheel Bearing Device 50

The wheel bearing device 50 is provided with a bearing cone 51 having a cylindrical main body 510 and a flange 511 to be attached to a wheel, a bearing cup 52 arranged on the outer peripheral side of the main body 510 of the bearing cone 51, plural rolling elements 53 arranged between the bearing cone 51 and the bearing cup 52, and the rotation detector 5 for detecting a rotating speed of the bearing cone 51 with respect to the bearing cup 52.

A spline fitting portion 510a for coupling a drive shaft along a rotational axis O thereof is formed at the middle portion of the main body 510 of the bearing cone 51. The flange 511 of the bearing cone 51 is formed integrally with the main body 510 so as to protrude radially outward of the main body 510. Plural through-holes 511a, into which bolts for attaching to a non-illustrated wheel are press-fitted, are formed on the flange 511.

The bearing cup 52 is formed in a cylindrical shape and is fixed by plural bolts 90 (only one bolt 90 is shown in FIG. 9A) to a knuckle 9 which is coupled to a vehicle body via a suspension device. A through-hole 9a for attaching a sensor module 7 described later is formed on the knuckle 9.

An annular space between the bearing cone 51 and the bearing cup 52 is sealed with a first sealing member 54 and a second sealing member 55. The first sealing member 54 is arranged on a side close to the flange 511 of the bearing cone 51 and the second sealing member 55 is arranged on the opposite side (on the vehicle body side). The second sealing member 55 is composed of a cored bar 551 having a substantially L-shape and an elastic member 552 bonded to the cored bar 551 by vulcanization bonding, and a cylindrical portion formed at an outer periphery of the cored bar 551 is press-fitted onto the outer peripheral surface of the bearing cup 52.

The rotation detector 5 is composed of the magnetic encoder 6 fixed to the bearing cone 51 on an outer periphery of the main body 510 and the sensor module 7 for detecting variation in a magnetic field with rotation of the magnetic encoder 6. The magnetic encoder 6 has a cylindrical shape attached to the outer peripheral surface of the bearing cone 51 by fitting, and has plural N-poles 61 and plural S-poles 62 which are alternately arranged along the circumferential direction as shown in FIG. 9B. A covering member 56 for preventing foreign substances from attaching to the magnetic encoder 6 is provided on the outer peripheral surface of the main body 510 of the bearing cone 51 at an end portion on the vehicle body side.

The magnetic encoder 6 rotates together with the bearing cone 51, so the polarity of magnetic pole (the N-poles 61 or the S-poles 62) at a portion facing the sensor module 7 changes with rotation of the bearing cone 51. In the rotation detector 5, by the sensor module 7, the change in magnetic polarity of the magnetic encoder 6 at a portion facing the sensor module 7 is detected as rotation of a wheel to which the flange 511 of the bearing cone 51 is attached.

The sensor module 7 has a magnetic field sensor 81 described later, a resin case 70 as a fixing member for housing the magnetic field sensor 81, and a cable 80 extending out of the resin case 70. The resin case 70 has a shaft-shaped main body 701, a cylindrical portion 702 having a cylindrical shape formed along an extending-out direction of the cable 80, and a fixing portion 703 fixed to the knuckle 9 by a bolt 91. A bolt insertion hole 703a for inserting the bolt 91 is formed on the fixing portion 703. Meanwhile, the through-hole 9a for inserting the main body 701 of the resin case 70 is formed on the knuckle 9 so as to penetrate the knuckle 9 in a thickness direction which is orthogonal to the rotational axis O.

Figure 11:
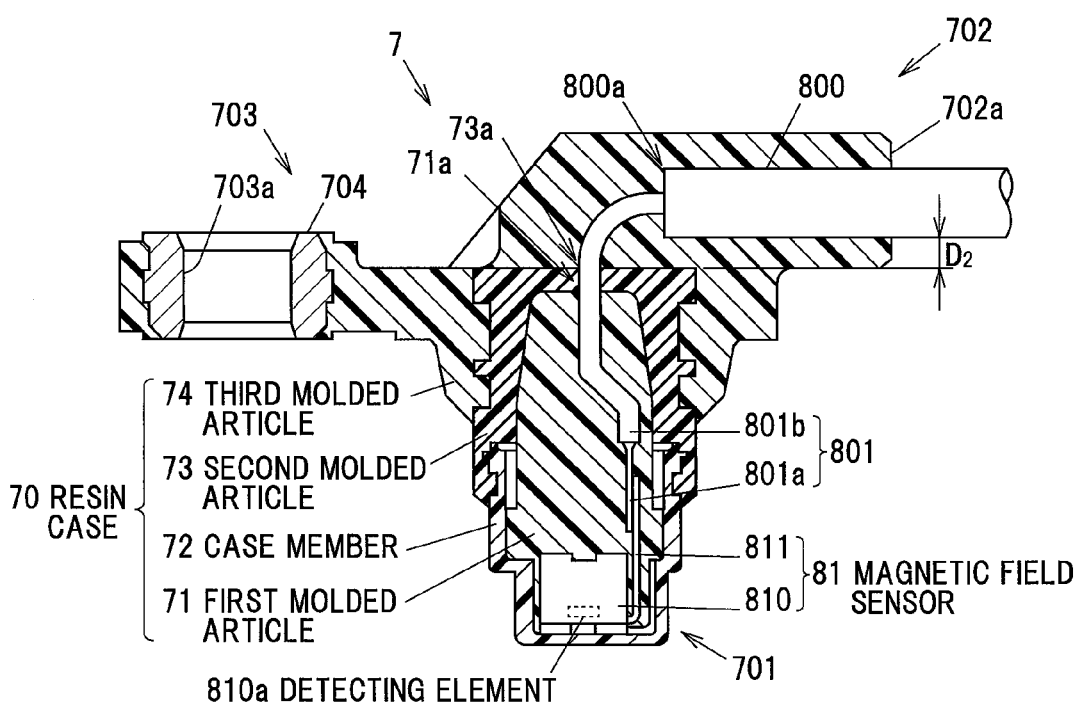
FIG. 11 is a cross sectional view showing the sensor module cut along a line B-B in FIG. 10B.

FIGS. 10A to 10E show the sensor module 7, wherein FIG. 10A is a front view, FIG. 10B is a top view, FIG. 10C is a bottom view, FIG. 10D is a left side view and FIG. 10E is a right side view. FIG. 11 is a cross sectional view showing the sensor module 7 cut along a line B-B in FIG. 10B.

As shown in FIG. 10A, the cable 80 extends out of an end portion 702a of the cylindrical portion 702 of the resin case 70. The extending-out direction of the cable 80 is orthogonal to the axial direction of the main body 701. In addition, as shown in FIG. 10E, the cable 80 has plural insulated wires 801 and a tubular sheath 800 covering the plural insulated wires 801 all together.

As shown in FIG. 11, the resin case 70 of the sensor module 7 has a first molded article 71, a case member 72, a second molded article 73 and a third molded article 74. Inside the resin case 70, the plural insulated wires 801 (only the foremost insulated wire 801 is shown in FIG. 11) of the cable 80 are exposed from the sheath 800. In each insulated wire 801, a center conductor 801a is covered with an insulation 801b.

The magnetic field sensor 81 has a sensor main body 810 including at least one detecting element 810a and plural lead wires 811 (only the foremost lead wire 811 is shown in FIG. 11) extending from the sensor main body 810. In FIG. 11, the detecting element 810a sealed inside the sensor main body 810 is indicated by a dashed line. The detecting element 810a is electrically connected to the plural lead wires 811 inside the sensor main body 810. In the second embodiment, the detecting element 810a is a Hall element. The detecting element 810a detects strength of a magnetic field which varies with rotation of the wheel (a magnetic field of the magnetic encoder 6 at a tip portion of the main body 701 of the sensor module 7).

The first molded article 71 is formed by molding so as to include the magnetic field sensor 81 and the insulated wires 801 of which center conductors 801a are connected to the lead wires 811 of the magnetic field sensor 81. The center conductors 801a are connected to the lead wires 811 by, e.g., welding or soldering. The insulated wires 801 are fixed along a longitudinal direction of the lead wire 811 inside the first molded article 71 and extend out of a first lead-out portion 71a of the first molded article 71.

The case member 72 is a molded resin formed by, e.g., injection molding and is a bottomed cylindrical member which covers an end portion of the first molded article 71 on the magnetic field sensor 81 side. The second molded article 73 is formed by molding so as to include an end portion of the case member 72 on an opening side as well as a portion of the first molded article 71 exposed from the case member 72. In addition, the second molded article 73 covers the first lead-out portion 71a of the first molded article 71 so that the insulated wires 801 extending out through the first lead-out portion 71a further extend out of a second lead-out portion 73a.

The first molded article 71, the case member 72 and the second molded article 73 form the main body 701 of the resin case 70 and correspond to a first fixing member of the invention which fixes end portions of the insulated wires 801 along the longitudinal direction of the lead wires 811 of the magnetic field sensor 81.

The third molded article 74 is formed by molding so as to cover an outer surface of the second molded article 73 including the second lead-out portion 73a and provides the cylindrical portion 702 and the fixing portion 703 of the resin case 70. The third molded article 74 corresponds to a second fixing member of the invention by which the insulated wires 801 exposed from the sheath 800 are fixed in a state of being bent between the sheath 800 and the second lead-out portion 73a of the second molded article 73. In addition, the fixing portion 703 has a cylindrical collar 704 formed of a metal such as aluminum in the molded third molded article 74, and a through-hole on the third molded article 74 serves as the bolt insertion hole 703a.

The insulated wires 801 are exposed from an end portion 800a of the sheath 800 which is fixed in a linear manner inside the cylindrical portion 702. The insulated wires 801 are fixed in a state of being bent inside the third molded article 74 and the cable 80 is thereby arranged such that an axial direction of the sheath 800 inside the cylindrical portion 702 intersects with a direction parallel to a longitudinal direction of the lead wires 811 of the magnetic field sensor 81.

In the second embodiment, the longitudinal direction of the lead wires 811 of the magnetic field sensor 81 is orthogonal to the axial direction of the sheath 800 inside the resin case 70 (the axial direction of the cylindrical portion 702). In more detail, the insulated wires 801 are curved in an arc shape at an angle of substantially 90° inside the third molded article 74.

The outer diameter of the sheath 800 and that of the insulated wire 801 can be set in the same manner as, e.g., those in the first embodiment. The radius of curvature of the insulated wires 801 bent inside the third molded article 74 is, e.g., not less than 3.5 mm and not more than 10 mm. In addition, a distance $D_2$ in the longitudinal direction of the lead wire 811 of the magnetic field sensor 81 between the second lead-out portion 73a of the second molded article 73 and the outer peripheral surface of the sheath 800 at the end portion 702a of the cylindrical portion 702 of the resin case 70 is, e.g., not less than 3.5 mm and not more than 10 mm.

Comparative Example

Figure 12:
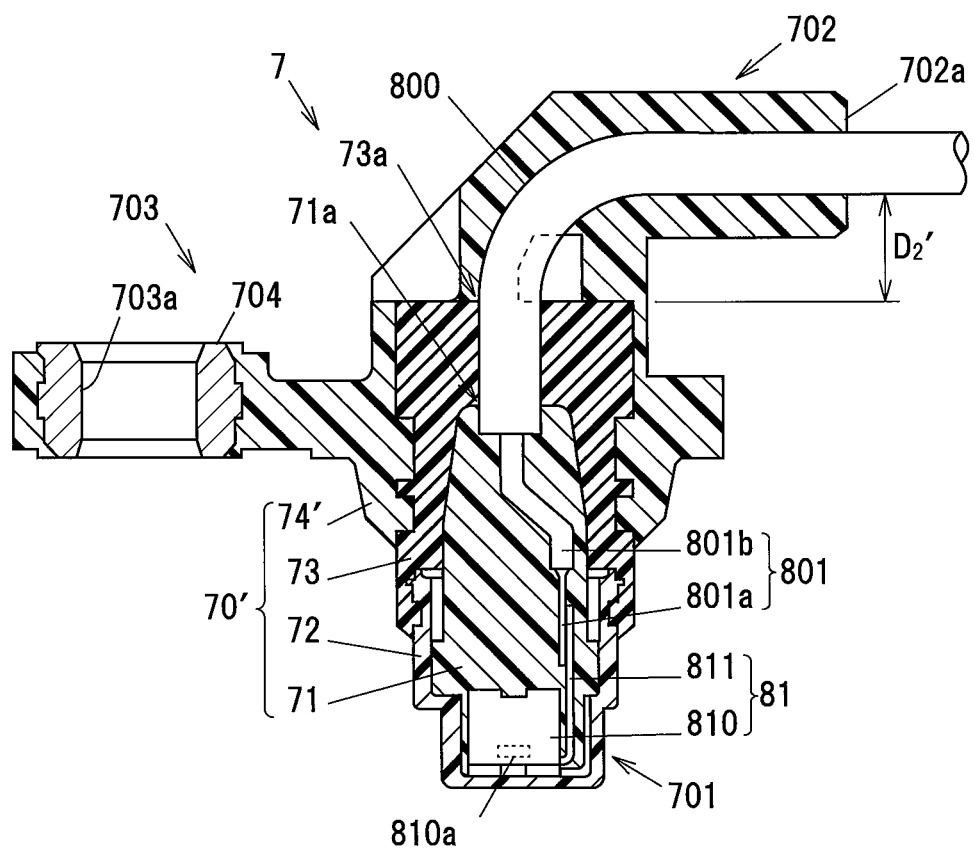
FIG. 12 is a cross sectional view showing a sensor module in Comparative Example with respect to the second embodiment.

FIG. 12 is a cross sectional view showing a sensor module 7A in Comparative Example. The sensor module 7A is configured in the same manner as the sensor module 7, except that a third molded article 74' of a resin case 70' has a different shape from the third molded article 74 of the sensor module 7 in the second embodiment and the end portion of the sheath 800 of the cable 80 is located inside the first molded article 71. In FIG. 12, substantially the same constituent elements as those of the sensor module 7 in the second embodiment are denoted by the same reference numerals as those in FIG. 11 and the explanation thereof will be omitted.

In the sensor module 7A, the sheath 800 of the cable 80, together with the insulated wires 801, is bent in an arc shape at an angle of 90° inside the third molded article 74'. The radius of curvature of the central axis of the sheath 800 inside the third molded article 74' is larger than that of the insulated wire 801 inside the third molded article 74 of the sensor module 7 in the second embodiment.

This difference in the radius of curvature occurs since the sheath 800 is less flexible than the insulated wire 801 due to the larger outer diameter and higher hardness. Therefore, the size of the third molded article 74' of the sensor module 7A is larger than the third molded article 74 of the sensor module 7 in the second embodiment. In addition, the a distance $D_2{'}$ in the longitudinal direction of the lead wire 811 of the magnetic field sensor 81 between the second lead-out portion 73a of the second molded article 73 and the outer peripheral surface of the sheath 800 at the end portion 702a of the cylindrical portion 702 of the resin case 70 is twice or more of the distance $D_2$ in the sensor module 7 of the second embodiment. Furthermore, the radius of curvature of the sheath 800 at the third molded article 74' is also twice or more of the radius of curvature of the insulated wires 801 at the third molded article 74 of the sensor module 7 of the second embodiment.

Functions and Effects of the Second Embodiment

The following functions and effects are obtained in the second embodiment.

(1) The cable 80 is arranged so that the sheath 800 is fixed in a linear manner inside the cylindrical portion 702 of the resin case 70 and the insulated wires 801 exposed from the end portion 800a of the sheath 800 are bent inside the third molded article 74, and the cable 80 thereby extends out from the end portion 702a of the cylindrical portion 702 of the resin case 70 in a direction orthogonal to the axis of the main body 701. This prevents the cable 80 extending out of the resin case 70 from coming into contact with other members (brake control system, etc.) mounted on a vehicle and allows the resin case 70 to be downsized (a decrease in the size in the axial direction of the main body 701), and mountability of the rotation detector 5 on the vehicle is improved.

(2) The insulated wires 801 are fixed along the longitudinal direction of the lead wires 811 of the magnetic field sensor 81 in the first molded article 71, in the case member 72 and in the second molded article 73 and are bent in the third molded article 74. This allows enough axial length of the main body 701 of the resin case 70 to be provided and the sensor main body 810 of the magnetic field sensor 81 to be positioned close to the magnetic encoder 6 and also it is possible to reduce the axial length of the main body 701 at the third molded article 74. In addition, it is possible to position the insulated wires 801 inside the resin case 70 by the first molded article 71, the case member 72 and the second molded article 73 and it is thus possible to prevent, e.g., the insulated wires 801 from being exposed to the outer surface of the third molded article 74 at the time of molding the third molded article 74.

Summary of the Embodiments

Technical ideas understood from the embodiments will be described below citing the reference numerals, etc., used for the embodiments. However, each reference numeral, etc., described below is not intended to limit the constituent elements in the claims to the members, etc., specifically described in the embodiments.

[1] An onboard detector (1, 5), comprising: a cable (40, 80) comprising insulated wires (401 to 406, 801) each formed by covering a center conductor (401a, 402a, 403a, 404a, 405a, 406a, 801a) with an insulation (401b, 402b, 403b, 404b, 405b, 406b, 801b) and a sheath (400, 800) covering the insulated wires (401 to 406, 801); sensors (41, 42, 81) comprising a sensor main body (410, 420, 810) including a detecting element (410a, 420a, 810a) and lead wires (411 to 413, 421 to 423, 811) extending from the sensor main bodies (410, 420, 810) and connected to the center conductors (401a, 402a, 403a, 404a, 405a, 406a, 801a); and a fixing member (30, 70) for fixing the sensors (41, 42, 81) to the cable (40, 80), wherein the fixing member (30, 70) is configured that the insulated wires (401 to 406, 801) exposed from the sheath (400, 800) are fixed in the state of being bent between the sheath (400, 800) and the lead wires (411 to 413, 421 to 423, 811) and, by fixing the insulated wires (401 to 406, 801) in a bent state, the cable (40, 80) is arranged such that an axial direction of the sheath (400, 800) inside the fixing member (30, 70) intersects with a direction parallel to a longitudinal direction of the lead wires (411 to 413, 421 to 423, 811).

[2] The onboard detector (1, 5) described in the [1], wherein the fixing member (30, 70) comprises a first fixing member (31, 71 to 73) for fixing end portions of the insulated wires (401 to 406, 801) along the longitudinal direction of the lead wires (411 to 413, 421 to 423, 811) and a second fixing member (32, 74) for fixing the insulated wires (401 to 406, 801) exposed from the sheath (400, 800) in a state of being bent between the sheath (400, 800) and the first fixing member (31, 71 to 73), and the second fixing member (32, 74) is a mold resin formed by molding to cover an end portion (400a, 800a) of the sheath (400, 800) and at least a portion of the first fixing member (31, 71 to 73).

[3] The onboard detector (1, 5) described in the [1] or [2], wherein the detecting element (410a, 420a) is a Hall element that detects magnetic field strength varying with a steering force of a steering wheel.

[4] The onboard detector (1, 5) described in the [1] or [2], wherein the detecting element (810a) is a Hall element that detects magnetic field strength varying with rotation of a wheel.

Although the embodiments of the invention have been described, the invention according to claims is not to be limited to the embodiments. Further, all combinations of the features described in the embodiments are not necessary to solve the problem of the invention.

In addition, the invention can be appropriately modified and implemented without departing from the gist thereof. For example, although the invention is applied to the torque detector 1 for detecting steering torque and the rotation detector 5 for detecting rotation of a wheel in the embodiments, it is not limited thereto. The invention is applicable to detectors which detect various physical quantities of a vehicle. In this case, the sensor used is not limited to the magnetic field sensor and it is possible to use temperature sensors, pressure sensors or yaw rate sensors, etc.

In addition, it is possible to obtain the effects of the invention as long as the axial direction of the sheath 400, 800 inside the resin case 30, 70 intersects with a direction parallel to the longitudinal direction of the lead wires 411 to 413, 421 to 423, 811 of the magnetic field sensors 41, 42, 81, and not necessarily orthogonal. The axial direction of the sheath 400, 800 inside the resin case 30, 70 may be inclined at an angle of, e.g., not less than 45° and less than 90° with respect to the longitudinal direction of the lead wires 411 to 413, 421 to 423, 811 of the magnetic field sensors 41, 42, 81.

What is claimed is:

1. An onboard detector, comprising:
    a cable comprising an insulated wire comprising a center conductor and an insulation covering the center conductor and a sheath covering the insulated wire;
    a sensor comprising a sensor main body comprising a detecting element and a lead wire extending from the sensor main body and connected to the center conductor; and
    a fixing member to fix the sensor to the cable,
    wherein the insulated wire fixed while being bent allows the cable to be arranged such that an axial direction of the sheath inside the fixing member intersects with a direction parallel to a longitudinal direction of the lead wire,
    wherein the fixing member comprises a first fixing member for fixing an end portion of the insulated wire along the longitudinal direction of the lead wire and a second fixing member for fixing the insulated wire exposed from the sheath while being bent between the sheath and the first fixing member,
    wherein the second fixing member comprises a molded resin to cover an end portion of the sheath and at least a portion of the first fixing member, and has a curve portion formed in an arc tube shape so as to be curved in an arch shape,
    wherein the insulated wire is disposed inside the curved portion so as to be curved in an arc shape along a central axis of the curved portion, and
    wherein at least most of the curved insulated wire inside the curved portion is not covered by the sheath.

2. The onboard detector according to claim 1, wherein the detecting element comprises a Hall element to detect a magnetic field strength varying according to a steering force of a steering wheel.

3. The onboard detector according to claim 1, wherein the detecting element comprises a Hall element to detect a magnetic field strength varying according to a rotation of a wheel.

4. The onboard detector according to claim 1, wherein the cable comprises a plurality of insulated wires, and wherein the plurality of insulated wires are curved by same radius of curvature.

5. The onboard detector according to claim 1, wherein the insulated wire is curved in an arc shape at an angle of substantially 90° inside the curve portion.

6. The onboard detector according to claim 1, wherein the first fixing member comprises a first molded article, a case member, a second molded article, which are possible to position the insulated wires inside the first fixing member.

7. The onboard detector according to claim 2, wherein the first fixing member comprises a first molded article, a case member, a second molded article, which are possible to position the insulated wires inside the first fixing member.

8. The onboard detector according to claim 3, wherein the first fixing member comprises a first molded article, a case member, a second molded article, which are possible to position the insulated wires inside the first fixing member.

9. The onboard detector according to claim 4, wherein the first fixing member comprises a first molded article, a case member, a second molded article, which are possible to position the insulated wires inside the first fixing member.

10. The onboard detector according to claim 5, wherein the first fixing member comprises a first molded article, a case member, a second molded article, which are possible to position the insulated wires inside the first fixing member.

11. The onboard detector according to claim 1, wherein the axial direction of the sheath inside the resin is inclined at an angle of not less than 45° and less than 90° with respect to the longitudinal direction of the lead wires.

12. The onboard detector according to claim 2, wherein the axial direction of the sheath inside the resin is inclined at an angle of not less than 45° and less than 90° with respect to the longitudinal direction of the lead wires.

13. The onboard detector according to claim 3, wherein the axial direction of the sheath inside the resin is inclined at an angle of not less than 45° and less than 90° with respect to the longitudinal direction of the lead wires.

14. The onboard detector according to claim 4, wherein the axial direction of the sheath inside the resin is inclined at an angle of not less than 45° and less than 90° with respect to the longitudinal direction of the lead wires.

15. The onboard detector according to claim 1, wherein the sensor is a temperature sensor.

16. The onboard detector according to claim 1, wherein the sensor is a pressure sensor.

17. The onboard detector according to claim 1, wherein the sensor is a yaw rate sensor.

* * * * *